Figure 1:
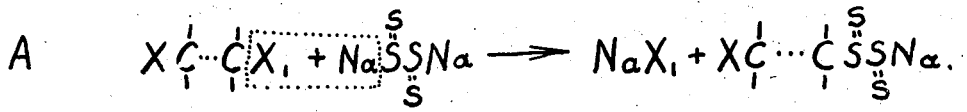

Sept. 24, 1940.  J. C. PATRICK  2,216,044

SULPHURIZED POLYMERS AND PLASTICS

Filed July 12, 1938

A

B

C

D

E

F

INVENTOR
Joseph C. Patrick
BY

ATTORNEY

Patented Sept. 24, 1940

2,216,044

UNITED STATES PATENT OFFICE 2,216,044

SULPHURIZED POLYMERS AND PLASTICS

Joseph C. Patrick, Morrisville, Pa., assignor to Thiokol Corporation, Trenton, N. J., a corporation of Delaware Application July 12, 1938, Serial No. 218,874

56 Claims. (Cl. 260—79)

This invention relates to the production of polymers and synthetic plastics and is a continuation-in-part of my applications Serial Nos. 188,278, 188,279 and 188,280, all filed February 2, 1938; Serial No. 724,619 filed May 8, 1934; Serial No. 38,515 filed August 30, 1935; Serial No. 107,026 filed October 22, 1936; Serial No. 616,496 (now United States Patent 1,996,487) filed June 10, 1932.

The polymers of this invention are substantially polymers of the structural unit

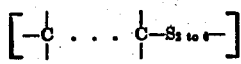

where

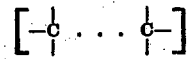

represents two carbon atoms separated by intervening structure.

In my Patent 1,890,191, there is described a reaction between an alkaline polysulphide and an olefin compound and this reaction leads to compounds which are substantially polymers of the structural unit

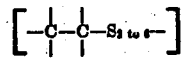

where the carbon atoms are adjacent.

It has been discovered that by opening up the space between these adjacent carbon atoms and placing intervening structure therein that great improvements in properties may be effected. For example, by placing either linkage between said carbon atoms, not only is elasticity, elongation and tensile strength greatly improved, coupled with the retention of the property of resistance to solvents, but an entirely new property, viz. the ability to retain the properties at low temperature, appears. Therefore, for example, gasoline conduits may be made which are not only elastic and resistant to gasoline at ordinary temperatures but also at low temperatures.

Again, by opening up the space between said carbon atoms and inserting aryl or aromatic structure therebetween, products are obtained having a combination of elasticity and hardness. In such products, the elongation may be low but the elasticity and tensile strength may be very high. This combination of elasticity, high tensile strength and low elongation is very valuable in the manufacture of numerous molded articles intended for rough usage where impact strength is important, e. g., telephone receivers.

The invention resides in the principle of obtaining compounds that are substantially polymers of the unit

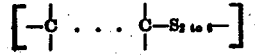

and the application of this principle, as defined in the claims ultimately appended hereto.

Certain specific embodiments of this principle will be fully explained, in order that the principle may be fully understood and in order that said principle may be applied to other embodiments thereof, not specifically herein set forth but nevertheless included within the claims.

The new product may be obtained by at least two routes or reactions, (1) by reaction between an alkaline polysulphide and an organic compound having at least two carbon atoms and substituents attached to each of said two carbon atoms and (2) by the oxidation of an organic compound having at least two carbon atoms and an —SH group attached to each of said carbon atoms.

It is preferred to produce the final products of this invention in two stages, (A) an intermediate stage and (B) a final stage. The product of the first stage may be obtained by either of the Reactions 1 or 2 listed above. In that stage the product is potentially reactive. The ultimate properties are inchoate. The intermediate product may be cured or vulcanized and the ultimate properties developed, by heating, especially in the presence of an oxidizing agent and the curing or vulcanization may be accelerated by catalysts, i. e., curing—or vulcanization—accelerators.

This division or separation of operations has a number of important advantages. Not only may the intermediate product be highly purified before converting it into its final form but that intermediate product may be readily worked in various ways to produce a multitude of different products, as different as phonograph records and coated fabrics. Therefore, the intermediate product can be sold in bulk to many different buyers who may mold it into many different shapes. The intermediate product can also be dispersed in organic solvents and used as a liquid coating, impregnating and binding material.

The intermediate material may be made in one place and sold in the form of a purified coagulum or dispersion in organic solvents or in other form. The buyers are not burdened with the necessity of carrying out the reactions necessary to produce the intermediate product and are supplied with what to them is a raw material capable of diverse uses.

This division of operations depends upon the fact that the invention provides for the production of said intermediate material and that it possesses potential reactivity, i. e. the property of undergoing further reaction when heated, e. g. by molding under heat and pressure.

The preparation of the intermediate, potentially reactive or uncured material is preferably effected in an aqueous medium in the presence of a dispersion agent, because this permits the production of the polymer in the form of a latex-like liquid analogous to the natural latex form in which rubber is produced by nature. In this latex-like liquid the intermediate polymer is suspended in an aqueous serum and the size of the particles is so small that substantially complete purification is readily effected by washing the latex with water, the latter possessing the property of mixing with water and thereafter settling out by the action of gravity.

Figure 2:
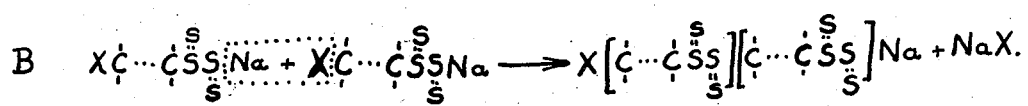
Figure 3:
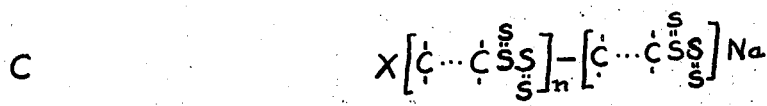
Figure 4:
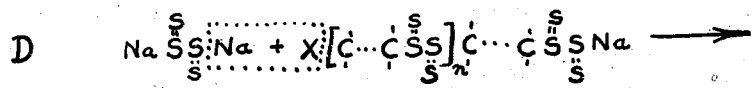
Figure 4:
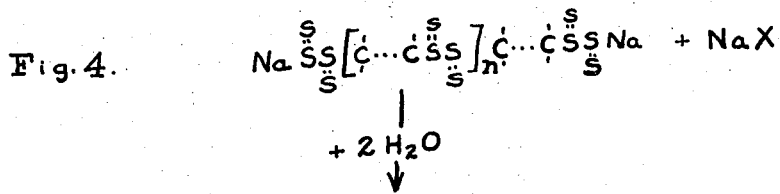
Figure 5:
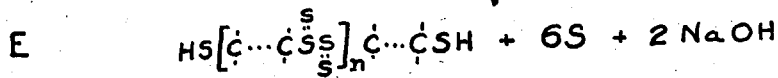
Figure 6:
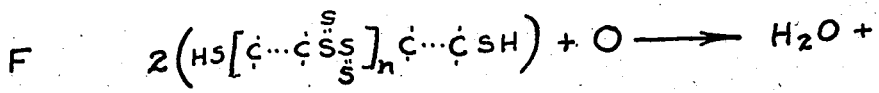
Figure 6:
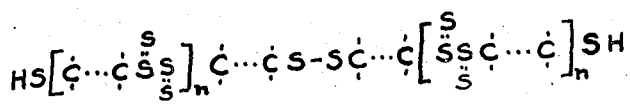

As above mentioned, the intermediate product may be prepared by at least two reactions, the mechanism of which will now be described, reference being had to the accompanying drawing, in which:

Figs. 1 to 6 show the mechanism of the polysulphide reaction.

In the polysulphide reaction an alkaline polysulphide is employed which may be derived by the reaction of sulphur with a member of the group consisting of alkali and alkaline earth metals, ammonia and amines, e. g., sodium, potassium, lithium, caesium, etc., barium, calcium, strontium, etc., ammonia and ethanolamines and the polysulphide may be a disulphide, trisulphide, tetrasulphide, pentasulphide or hexasulphide, e. g., $Na_2S_x$ where $x$ is an integer of 2 to 6.

In the polysulphide reaction the molecules of the organic substance become joined together to form a complex pattern or chain, i. e., the relatively small molecules of the organic substance are joined together to form a very large molecule or polymer. This joinder takes place through the medium of the sulphur in the polysulphide. This sulphur acts as a sort of bridge from one molecule to the next. As a result, the reaction products have high percentages of sulphur. They also have colloidal properties.

Reaction A occurs because the Na (sodium) unites with the X' atom or radical, i. e., splits off the said X' atom or radical from the compound

This causes the group

to take the place of X' and a new compound is formed as shown in Equation A.

In reactions A and B above, X and X' are respectively any substituents which can be split off by treatment with an alkaline substance, e. g., halogen, acid sulphate, nitrate, acid phosphate, bicarbonate, formate, acetate, propionate, laurate, oleate, stearate, oxalate, acid malonate, acid tartrate, acid citrate, etc.

As a result of reaction A, a molecule is produced having a replaceable substituent attached to one carbon atom, and a sodium polysulphide radical

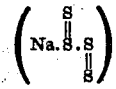

atom attached to another carbon atom.

Owing to the capacity of the sodium to unite with the replaceable acidic substituent, the compound produced in Equation A has the remarkable ability of uniting with itself, as shown in Equation B.

Moreover, the compound produced as shown in Equation B unites with itself in the same manner and this continues until the size of the molecule is so large that its sluggishness prevents further condensation or self-union.

This ability requires the existence of a sodium polysulphide radical (or its equivalent) on one carbon atom and a replaceable substituent on another carbon atom of the same compound.

If this rule is observed, union of the compound containing said pair of carbon atoms to form a compound containing a tetrad or quartet of carbon atoms does not exhaust the reaction because each terminal carbon atom of this quartet will also have attached thereto, respectively, a replaceable substituent and a sodium polysulphide radical, so that the quartet or tetrad can form an octad, etc.

This permits a building up of a carbon chain in geometrical progression starting with a compound containing (but not necessarily consisting of) two carbon atoms.

The fundamental requirement is that the starting compound shall have at least two carbon atoms and at least two substituents attached to said carbon atoms, respectively, so that reaction of this compound with sodium polysulphide will replace one of these substituents with a sodium polysulphide radical as set forth in Equation A and produce a compound having a replaceable substituent on one carbon atom and a sodium polysulphide radical on another carbon atom.

The unit of the chain is the said pair of carbon atoms plus a group of sulphur atoms thus:

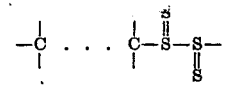

where the group of sulphur atoms is the tetrasulphide group. This group may be the disulphide group —S—S—, the trisulphide group

the tetrasulphide group shown, the pentasulphide group

or the hexasulphide group

depending upon whether an alkaline disulphide, trisulphide, tetrasulphide, pentasulphide or hexasulphide is used. With this explanation the reaction can be regarded from the mechanical point of view and it is clearest when so regarded. The said unit can be likened to a unit building block with at least two interlocking members on each unit. For example, one of these members may have a male thread and the other a female thread. The male member on one unit can then engage the female member on another unit, so as to build up a chain or complex structure analogous to the polymer of this invention. There must be at least two of such interlocking members on each unit. Otherwise the length of the chain is limited to a union of two elements.

Referring now to the diagram, the compound shown as produced in reaction B continues to unite with itself until a long chain is built up having the formula shown at C. This then loses its X terminal and acquires —SH terminals at each end by hydrolysis, as shown in Equations D and E. At this stage the condensing or polymerizing action of the polysulphide substantially ceases.

It is desirable to carry out the above reaction in an alkaline dispersion medium as specifically illustrated in Example 1 below, and to produce the polymer at the above mentioned stage in the form of a latex-like liquid from which the polymer may be separated by various means, e. g., coagulation produced by the addition of acid. This latex has the property of mixing intimately with water without dissolving therein and may therefore be washed thoroughly to remove soluble impurities.

Notwithstanding the large size of the molecule produced as indicated at E, further increase in size may be caused by employing oxidation, preferably while the product is still in the dispersed form and prior to the curing step, i. e., while the polymer is still in the intermediate stage. This may be done by blowing air through the dispersion, provided it is definitely alkaline, or by employing any of a number of oxidizing agents effective under alkaline conditions, such as hydrogen peroxide; benzoyl peroxide; sodium, potassium, barium and calcium peroxides; perborates, permanganates, chromates and dichromates, etc. When oxidized the polymer shown at E condenses as indicated by Equation F in the diagram.

Alkaline polysulfides are themselves oxidizing agents provided an excess be employed over the equimolecular proportions shown in Equations A to E inclusive.

It is generally desirable to increase the size of the molecule as much as possible in the intermediate stage, because this in conjunction with the subsequent curing tends to develop the desirable qualities of mechanical strength, elasticity, resistance to chemicals and solvents, etc., to the highest degree.

Proof that the reaction occurs by the mechanism shown and that the products obtained have the formulae shown include the following:

(a) Taking BB' dichlorinated ethyl ether as an example, the chlorine of the compound appears quantitatively in the form of sodium chloride as a by-product.

(b) After isolating the polymer from the soluble by-products the weight of the polymer is quantitatively equal to the weight of the dichlorinated ether minus the halogen plus the sulphur from the alkaline polysulphide.

(c) The proportion of sulphur in the polymer is equal to that in the following formula:
[$C_2H_4.O.C_2H_4.S_4$]

(d) Attempts to determine molecular weight of the polymer shows that it is very high. This is substantiated by the properties as herein described.

(e) A polymer having properties identical with those obtained by reacting dihalogenated ethyl ether with sodium tetrasulphide can be obtained by an entirely different route, as shown by the following equations, which illustrate the mercaptan reaction mentioned above:

(1)
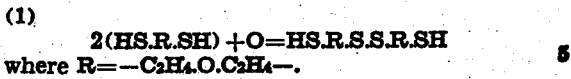
where R=—$C_2H_4.O.C_2H_4$—.

The above dimercapto ether may be obtained by reacting BB' dichlorethyl ether with sodium hydrosulphide NaSH.

(2)

This continues until a polymer is built up having the formula (3)
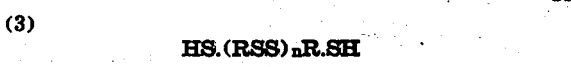

This on further oxidation gives (4)

The above Compound 4 reacts with sulphur to produce a product identical with that shown in Equation F in the diagram and conversely the product shown in Equation F can be partially desulphurized to produce a product identical with that shown at (4) above.

The above mercaptan reaction shows that the linkage between the organic carbon radicals is through a sulphur bridge.

(f) X-ray examination shows that the distance between the carbon radicals is equal to the sum of the diameters of two sulphur atoms.

The two sulphur atoms referred to are bound firmly and form the direct bridge between the carbon radicals whereas the remaining sulphur atoms are in labile form and may be removed by a partial desulphurizing action as already mentioned.

In the formula shown in the drawing in Equation F, the value of $n$ is so great that the product is substantially and practically a polymer of the unit

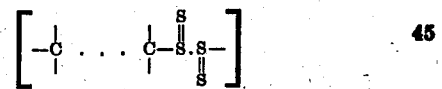

and the product reacts as such. For example, three mols of this unit react with two mols of sodium sulphide according to the following equation:

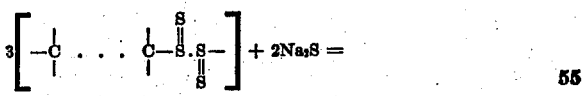

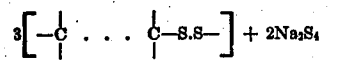

and the resulting product is identical in all its properties with the product produced by oxidation of a polyfunctional mercaptan as shown in Equations 1 to 4 above.

Conversely, the polymer shown in Equation 4 above as produced by oxidation of a polyfunctional mercaptan behaves substantially as a polymer of the unit

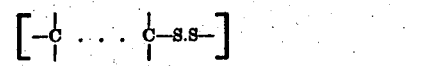

A mol of this unit will react with two atoms of sulphur as follows:

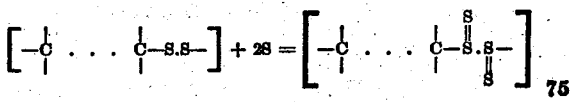

and the product obtained is identical in all its properties with that shown in Equation F in the diagram.

This is further proof that the organic radicals in the polymer, i. e., the carbon radicals, are joined together through a bridge of two sulphur atoms. This bridge is in firm chemical combination, whereas the remaining sulphur atoms in the polysulphide polymer are in labile condition and may be removed by partial desulphurizing agents, for example, alkaline monosulphides, alkalies including NaOH and KOH, and sulphites.

In the above equations, instead of the tetrasulphides, the di, tri, penta and hexasulphides similarly react.

The fundamental requirement for the reactions shown in Figs. 1 to 6 is an organic compound having at least two carbon atoms and a substituent attached to each of said carbon atoms, which substituent is split off during the reactions which occur when said compound is treated with an alkaline polysulphide.

For the mercaptan reaction it is necessary to have an organic compound having at least two carbon atoms and an —SH group attached to each of said carbon atoms, thus

These carbon atoms may be adjacent or separated by intervening structure and in the present invention they are so separated.

Compounds produced by the polysulphide reaction shown in Figs. 1 to 6 are substantially polymers of the unit

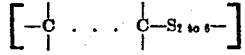

Compounds produced by the mercaptan route are substantially polymers of the unit

Polymers of the unit

contain labile sulphur upon removal of which, as by reaction with reducing or desulphurizing agents, they are converted to polymers of the unit

and conversely the latter can be converted into the former by reaction with one to four atomic weights of sulphur for each molecular weight of said unit.

In Patent 1,890,191 there is disclosed a reaction between an alkaline polysulphide and compounds having two adjacent carbon atoms and a halogen attached to each of said adjacent carbon atoms. Where the said carbon atoms are adjacent compounds produced therefrom are polymers of the unit

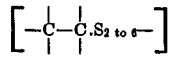

It has been discovered that great improvements can be effected by opening up the space between said adjacent carbon atoms and inserting therebetween intervening structure. By this means polymers of the unit

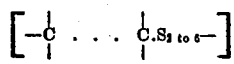

are produced where

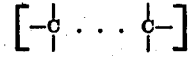

represent carbon atoms separated by intervening structure.

All intervening structure between said reactive carbon atoms modifies the character of the polymers obtained, as compared with the polymers produced from compounds having no intervening structure between said reactive carbon atoms and the present invention involves the concept of providing intervening structure between said reactive carbon atoms.

As a result of the application of this concept, polymers can be produced having a variety of special properties for special uses and the boundaries of utility of the polymers have been greatly extended. The invention will be further described by illustrating the production and properties of polymers where the intervening structure between the pair of reactive carbon atoms is selected from the following classes, it being understood that other intervening structure may be employed:

Ether linkage.
Unsaturated carbon atoms.
Aromatic structure.
Saturated straight chain carbon atoms.
Saturated branched chain hydrocarbons.

WHERE THE INTERVENING STRUCTURE IS OR CONTAINS AN ETHER LINKAGE

When the said pair of carbon atoms are joined to and separated by intervening atomic structure characterized by an ether linkage, certain important advantages are obtained. These advantages relate particularly to the polymer in its final form, i. e., the form produced by curing the polymer in its intermediate stage. These advantages are in general characterized by a combination of the following properties: elasticity, mechanical strength, retention of these properties at low temperatures, insolubility in common solvents and resistance to distortion by heat.

A specific example, for the purpose of illustration, of one method of obtaining a polymer of the unit

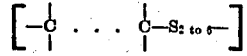

where

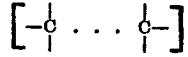

represents two carbon atoms separated by intervening structure characterized by an ether linkage is a reaction between BB′ dihalogenated ethyl ether and sodium tetrasulphide. The polymer produced is substantially a polymer of the unit

S may be $S_2$, $S_3$, $S_4$, $S_5$ or $S_6$, depending on whether an alkaline di-, tri-, tetra-, penta- or hexasulphide is used.

By reacting the polymer, where S is 3 to 6, with a reducing or desulphurizing agent, i. e., an agent capable of combining with sulphur, as more fully set forth in my copending application Serial No. 28,614, filed June 27, 1935, the labile sulphur may be removed and the polymer converted thereby into a polymer of the unit

and this may be converted from its disulphide form to the corresponding tri-, tetra-, penta- or hexasulphide form by heating or reacting one mol of said unit with one, two, three or four atomic weights of sulphur.

Moreover, a polymer of the unit $$[—C_2H_4.O.C_2H_4—S_2]$$

may be obtained by a different reaction, i. e., by oxidizing BB' dimercapto ethyl ether. The disulphide polymers have certain advantages over the polysulphide polymers.

The general formula for polymers of the unit

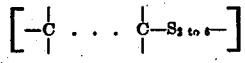

where

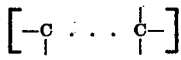

represents carbon atoms separated by and joined to structure characterized by an ether linkage is

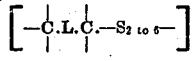

where L represents an oxygen atom or the group —R.O.R'—, R and R' being respectively alkyl, aralkyl or aryl radicals.

The reaction between sodium tetrasulphide and BB' dihalogenated ethyl ether will now be described in detail, it being understood that instead of halogens, numerous other substituents could be used (e. g., acid sulphate, acid phosphate, formate, acetate, propionate, acid tartrate, etc., which substituents, like halogen, are split off during the reaction. The halogen substituent, specifically chlorine, is used because of economic reasons.

*Example 1.*—Into a closed reaction tank suitably equipped with stirring means, pipe coils for steam and cold water and a thermometer, are placed 2000 liters of 3-molar sodium tetrasulphide solution. To the polysulphide solution are added with vigorous agitation, 10 kilograms of caustic soda dissolved in 15 liters of water. This is followed by the addition of 25 kilograms of crystallized magnesium chloride (MgCl$_2$.6H$_2$O) dissolved in 20 liters of water.

The polysulphide mix is heated to about 135° F. and about 700 kilograms (5 kilogram mols of BB' dichlorethyl ether are added gradually over a period of about three hours. The rate of addition of the dichloro ether is so regulated as to prevent the temperature of the reaction from going above about 210° F. during the reaction.

When all the chloro ether has been added and the temperature shows a tendency to drop, steam may be admitted to the heating coils and so regulated as to maintain a temperature of from 215° to 220° F. for about three hours during which time the latex-like dispersion of the polymer is constantly stirred or agitated. The heating step just described is carried out in order that the excess of polysulphide over that actually required to decompose the dichlor ether may exert a condensing or polymerizing effect on the reaction product as first formed, as illustrated in Equation F of the annexed drawing.

The finely divided latex-like dispersion of the polymer may now be freed from water-soluble impurities by any suitable means, such as filtration and repeated washing with water, or it may be washed by repeated settling of the particles and removal of supernatant liquid, followed by resuspension in clean water and repetition of the settling process. The washed latex-like dispersion may now be used in the dispersed form or it may be separated from excess water by filtration and drying to give an elastic mass; or it may be treated with sufficient dilute acid, for example dilute hydrochloric, sulphuric or acetic acid, to confer a slight acidity on the latex-like dispersion, whereupon coagulation occurs. The coagulum can be freed from adherent and occluded water by mastication or kneading on rolls or by prolonged drying or by subjecting to pressure.

It will be noted that in the above example six kilogram mols of the polysulphide were used whereas only about five kilogram mols of the organic reactment were used, leaving about 20 molar per cent excess of the polysulphide. This procedure provides an excess of polysulphide over that required for decomposition of the organic compound and this excess is available for the second step which results in further polymerization of the product due to the oxidizing effect of the excess polysulphide on the finely divided reaction product during the prolonged heating period.

Equimolecular proportions of the organic reactant could be used with the polysulphide and after the saponification is complete an additional treatment with more polysulphide could be made. Moreover, the latex could be washed and then further polymerized, e. g., by treatment with a current of air in an alkaline medium. Substantially the same result is obtained finally but the method given is considered the most convenient and economical, especially in view of the fact that the excess of polysulphide can be recovered if desired.

In the above example, instead of BB' dichlorethyl ether, any member selected from the following list can be employed using the same molecular proportions:

Table I $$CH_3.CH_2X.O.CH_2X'.CH_3$$

AA' disubstituted ethyl ether.

$$X.C_2H_4.O.C_2H_4.X'$$

BB' disubstituted ethyl ether.

$$X.CH_2.O.CH_2.X'$$

disubstituted methyl ether.

$$X.C_2H_4O.C_2H_4.O.C_2H_4.X'$$

disubstituted ethoxy ethyl ether.

$$X.C_2H_4.S.C_2H_4.X'$$

disubstituted thio ethyl ether.

$$X.CH_2.S.CH_2.X'$$

disubstituted thio methyl ether.

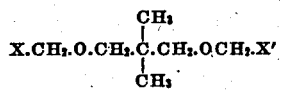

disubstituted 1,3 methoxy, 2,2 dimethyl propane.

$$X.CH_2.CH_2.CH_2.O.CH_2.O.CH_2.CH_2.CH_2.X'$$

disubstituted dipropyl formal.

$$X.CH_2.CH_2.O.CH_2.O.CH_2.CH_2.X'$$

disubstituted diethyl formal.

disubstituted dimethoxy ethane.

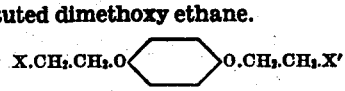

disubstituted para diethoxy benzene.

X.CH₂O.CH₂.CH₂.OCH₂.X' disubstituted dimethoxy ethane.

X.CH₂.CH₂.CH₂.S.CH₂.CH₂.CH₂.X' disubstituted dipropyl thio ether.

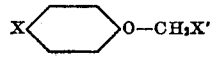

pp' disubstituted diphenyl ether.

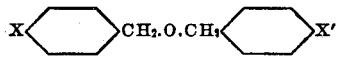

disubstituted anisole.

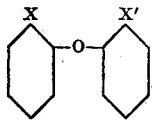

disubstituted dibenzyl ether.

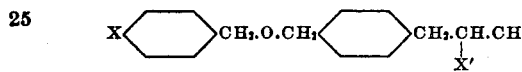

oo' disubstituted diphenyl ether.

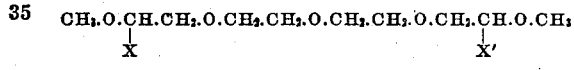

disubstituted para propyl dibenzyl ether.

X.CH₂.CH₂.SO₂.CH₂.CH₂.X' disubstituted diethyl sulphone.

X.CH₂.CH₂.CH₂.SO₂.CH₂.CH₂.CH₂.X' disubstituted dipropyl sulphone.

CH₃.O.CH.CH₂.O.CH₂.CH₂.O.CH₂.CH₂.O.CH₂.CH.O.CH₃
     |                                             |
     X                                             X' disubstituted dimethoxy tetra ethylene glycol.

CH₃.CH₂.CH.O.CH.CH₂.CH₃
         X   X'

AA' disubstituted propyl ether.

CH₃.CH₂.CH₂.O.CH₂.CH₂.CH₃
           X        X' gamma gamma disubstituted propyl ether.

CH₃.CH.CH₂.O.CH₂.CH.CH₃
     X             X'

BB' disubstituted propyl ether.

CH₃.CH.CH₂.O.CH₂.CH₂.CH₃
     X              X' alpha beta disubstituted propyl ether.

CH₃.CH₂.CH₂.O.CH.CH₂.CH₃
           X     X' alpha gamma disubstituted propyl ether.

CH₃.CH₂.CH₂.CH.O.CH.CH₂.CH₂.CH₃
              X    X' alpha alpha disubstituted butyl ether.

CH₃.CH₂.CH.CH₂.O.CH₂.CH.CH₂.CH₃
         X                X' beta beta disubstituted butyl ether.

CH₃.CH.CH₂.CH₂.O.CH₂.CH₂.CH.CH₃
     X                      X' gamma gamma disubstituted butyl ether.

CH₃.CH₂.CH₂.CH₂.O.CH₂.CH₂.CH₂.CH₃
 X                                  X' delta delta disubstituted butyl ether.

In some of the examples set forth in the above list it will be noted that the substituents which are split off are attached directly to an aromatic nucleus. The reaction is carried out as in Example 1, except that the temperature is increased as, for example, by working in an autoclave or bomb. The temperature necessary may be illustrated by the fact that in the case of pp' dichloro diphenyl ether, a temperature of about 500° F. for about one hour is necessary.

The proportion of sulphur to the polymers produced from the above compounds varies from 20 to 80 per cent, depending upon whether the sulphur in the unit

is a group of two, three, four, five or six sulphur atoms and also depending upon the molecular weight of the disubstituted compound.

In the above group there are found formals, ethers, thioethers, sulphones, alkoxy compounds and aryloxy compounds. In all however there are two carbon atoms joined to and separated by structure characterized by an ether linkage. This is a common quality running through the entire series. To each of the said carbon atoms there is joined a substituent which is split off. An ether linkage is defined as an oxygen or sulphur atom functioning as a link or bridge between two adjacent carbon atoms, thus R—O—R' or R. S. R.' where R and R' are carbon atoms and structure characterized by an ether linkage in the oxygen or sulphur atom itself or structure containing said oxygen or sulphur atom functioning in the manner described.

Owing to this common quality, the polymers produced from these compounds by reaction with an alkaline polysulphide have a number of outstanding and important properties which distinguish them from the polymers produced from disubstituted ethylene and propylene, as already described. This is particularly true after the intermediate potentially reactive polymers have been cured, and the curing step will be illustrated by the following example:

Example 2

| | Parts by weight |
|---|---|
| Polymer produced as in Example 1 | 100.00 |
| Zinc oxide | 10.00 |
| Stearic acid | 0.05 |
| Benzothiazyl disulphide | 0.25 |
| Carbon black | 60.00 |

The above ingredients are thoroughly mixed by mastication and then the resulting compound is cured by heating to about 300° F. for about one hour. Instead of zinc oxide other oxidizing agents can be used, e. g. oxides of copper, lead, bismuth, antimony, arsenic, manganese and chromium. Organic oxidizing agents including benzoyl peroxide and organic mono and poly nitro compounds can also be used.

The distinguishing characteristics can be summarized as follows:

(1) Elongation of over 200 per cent without rupture and retraction substantially to its original shape after such elongation.

(2) The ability to retain the above property at temperatures as low as about −30° F.

(3) Ability to remain substantially unswollen by long immersion in gasoline, petroleum ether, lubricating oil and other pariffin hydrocarbons.

(4) Ability to be only slightly swollen by long immersion in benzol, toluol and carbon tetrachloride.

These outstandingly important properties have been obtained by opening up the space between the carbon atoms in the unit

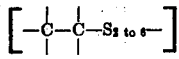

and inserting therein structure characterized by an ether linkage, as amply illustrated by the list of compounds hereinabove set forth.

It has already been stated that the polymers of this invention may be produced not only by the alkaline polysulphide reaction but also by oxidizing polymercapto compounds. A specific illustration will be given as follows:

Example 3.—138 lbs. or 1 mol of dimercapto ethyl ether, $SH.C_2H_4.O.C_2H_4.SH$ are dissolved in 100 gallons sodium hydroxide solution containing 90 lbs. of NaOH; that is, an amount of NaOH slightly in excess of 2 mols. With this solution there is intimately mixed a freshly prepared suspension of magnesium hydroxide made by treating 10 pounds of $MgCl_2.6H_2O$ with 2 gallons of water and adding thereto a solution of 4 lbs. NaOH dissolved in 0.5 gallon of water. The entire mixture is then placed in a reaction vessel provided with stirring means and also means for heating, for example, steam coils. The mixture is subjected to stirring and to this is gradually added an oxidizing agent in the form of a solution of sodium polysulphide (made, for example, by dissolving 348 lbs. or 2 mols of sodium tetrasulphide in 100 gallons of water) during a period of about ten minutes. The reaction occurs approximately at room temperature and is somewhat exothermic. The reaction is substantially completed after all the polysulphide has been added. The completion of the reaction is indicated by withdrawing a sample, acidifying it and observing whether the odor of mercaptan is absent. Stirring may be continued until the reaction is completed, as indicated by this test.

The polysulphide acts as an oxidizing agent and converts the dimercapto ethyl ether into a complex polymer or plastic. The advantage of the magnesium hydroxide is that the said polymer or plastic is produced in the form of a latex-like liquid which has the unique property of being capable of intimate mixture with water and settling out subsequently by the action of gravity. This property permits intimate and thorough washing to remove soluble impurities. Acidification of the latex-like liquid causes the separation of polymer as an agglomerated mass, the removal of the impurities from which would be a difficult problem. It is therefore highly desirable to accomplish the washing while this mass is in dispersed form, inasmuch as under such conditions the high degree of dispersion of the polymer permits an extremely thorough removal of the soluble impurities by washing. The difficulty of transporting the latex in agglomerated form, and the ease with which it sticks to parts of apparatus, such as the stirrer, also makes it advisable to produce the polymer in the reaction vessel in its dispersed latex-like form, from which vessel it can be readily removed because of its fluid characteristics. If the polymer were produced in the reaction vessel in its coagulated rubbery form it would be difficult to remove it therefrom and it would be contaminated with the reagents used in its manufacture.

Washing of the polymer in its dispersed condition may be accomplished in the reaction vessel by stirring it up with successive quantities of water, settling and drawing off the supernatant wash liquid. The washing can, of course, be accomplished in a different vessel. In any event, it is desirable to preserve the polymer in its dispersed condition until after removal from the reaction vessel.

The washed latex is then transferred to a second vessel where coagulation or agglomeration is produced by acidification. Sufficient acid may be added for this purpose until the mother liquid is acid to methyl orange or brought to a pH of about 3. The coagulated polymer is then dehydrated by any suitable method, e. g., milling, mastication or kneading. In such processes, considerable heat is generated which, together with the mechanical action, causes the removal of water.

In the above example, instead of sodium hydroxide as the agent for dissolving the dimercapto compound, other alkaline hydroxides could be used, for example, potassium, ammonium, lithium, calcium, barium, strontium, and in general any other alkaline materials which will not form highly insoluble sulphides.

Instead of magnesium hydroxide, other gelatinous hydroxides may be employed, for example, aluminum hydroxide, chromium hydroxide, ferric hydroxide. Dispersing agents other than hydroxides may be employed, for example, gelatin, albumin, casein, agar, soluble cellulose esters, etc.

Instead of sodium polysulphide, other polysulphides may be employed, e. g., potassium and ammonium polysulphide or any other soluble polysulphide. Other oxidizing agents may be used, for example, oxygen, air, ozone, hypohalites, and in general any oxidizing agent effective in an alkaline solution, for example, hydrogen peroxide, and metallic peroxides, perborates, chromates, dichromates, manganates and permanganates, etc. The reaction is preferably carried on under alkaline conditions because it has been found that the reaction is very favorably influenced by such conditions.

Although in the above example, the step of agglomerating or coagulating the polymer was specifically described, it is in some cases advantageous to preserve the polymer in its dispersed form, as such, e. g., for use in coating and impregnating various materials.

The product obtained in this case is a white coagulum which, upon drying, is in thin sheets, a pale amber translucent and highly elastic solid. When compounded with oxidizing agents including zinc oxide, it undergoes transformation by heat. The transformed product is highly elastic and resistant to tear. It is practically unaffected by immersion in gasoline over long periods and will withstand exposure to benzene. The presence of an organic acid or substance, as for example, an organic cyanide, capable of yielding small amounts of an organic acid at curing temperatures, in the presence of traces of moisture always present, assists in the cure and improves the final properties of the cured compound.

One of the important properties of the product of this invention is its capacity to be transformed by heat into a plastic or product having valuable commercial properties.

The following is a specific illustrative example of the curing or transformation of the intermediate polymer into its final state by heat.

Example 4

| | Pounds |
|---|---|
| Intermediate polymer prepared as in Example 3 | 100.00 |
| Zinc oxide | 10.00 |
| Carbon black | 60.00 |
| Stearic acid | 0.50 |
| Mercaptobenzo thiazole | 0.25 |

These ingredients are thoroughly mixed and then subjected to a temperature of 290° F., for 60 minutes or 300° F. for 30 minutes.

The properties of the cured product are as follows:

| | |
|---|---|
| Tensile strength | About 1700#/sq. in. |
| Elongation at break | About 500%. |
| Temperature resistance | Will not become inflexible above −45° F. Will stand about 200° F. continuously. |
| Solvent resistance | Substantially unaffected by water, gasoline, paraffin hydrocarbons, dilute acids and alkalies. Very slightly affected by solvents, such as benzol, toluol, xylol. Unaffected by alcohol, acetone and esters. |
| Tear and abrasion resistance | Excellent. |
| Electrical properties | Closely approaching those of natural rubber. |
| Stability | Substantially unaffected by age or sunlight. Uniquely resistant to ozone, oxygen or air. |
| Effect of gases | Highly resistant to diffusion. About 40 times less permeable than natural rubber. |

The product produced as in Examples 3 and 4 is a cured polymer of the unit

[—C₂H₄.O.C₂H₄—S₂—]

whereas that prepared as in Examples 1 and 2 is a cured polymer of the unit

[—C₂H₄.O.C₂H₄—S₄—]

A comparison of the physical properties of the respective products shows the advantages of the former over the latter.

In Example 3, any of the compounds hereinabove listed, where X and X' signify —SH groups, can be substituted for the dimercapto ethyl ether.

The compound produced as in Example 3 is substantially a polymer of the unit

[—C₂H₄.O.C₂H₄—S₂]

It may be produced not only as shown in Example 3, but also by removing the labile sulphur from the tetrasulphide polymer produced as in Example 1. This will be specifically illustrated by the following example:

*Example 5.*—Proceed as in Example 1 up to but not including the step of coagulation. Add 250 kilograms (6.25 kilogram mols) of NaOH dissolved in 500 liters of water, raise the temperature to 212° F. and maintain there for about 30 minutes. Then cool, settle and proceed as in Example 1 to wash the latex and coagulate the polymer. Instead of NaOH numerous other desulphurizing agents can be used, e. g., sodium sulphide, sodium sulphite, sodium hydrosulphide, sodium acid sulphite, etc.

The advantages to be obtained by opening up the space between the reactive carbon atoms and placing therein structure characterized by an ether or ether-like linkage may be illustrated by the following comparative table wherein the properties of cured polymers made by reacting (A) ethylene dichloride and (B) BB' dichlorethyl ether, respectively, with an alkaline polysulphide are set forth, the tetrasulphide polymer being referred to in each case and all conditions being the same except the nature of the structure intervening between the reactive carbon atoms:

| | A | B |
|---|---|---|
| Tensile strength | 650 lbs./sq. in. | 1,000 lbs./sq. in. |
| Elongation at break | 500% | 700%. |
| Temperature resistance | Brittle at +5° F | Brittle at −40° F. |
| Odor | Bad | Practically odorless. |

Having explained the advantages to be obtained by inserting structure characterized by an ether linkage, the invention will be further described by illustrating various other intervening structure.

INTERVENING STRUCTURE CHARACTERIZED BY

A specific example for the purpose of illustration is a reaction between an alkaline polysulphide and 1,4 disubstituted butene 2

X.CH₂.CH=CH.CH₂.X'

This reaction is specifically described as follows:

*Example 6.*—Proceed as in Example 1, substituting 1,4 di-chlorobutene 2 for BB' dichlorethyl ether, in the same molecular proportions.

In the above example, instead of 1,4 dihalogenated butene 2, any member selected from the following list can be employed, using the same molecular proportions.

Table II

disubstituted 3 tolyl propene 2.

X.CH₂.CH=CH.CH₂.CH₂.X' disubstituted pentene 2.

X.CH₂.CH=CH.CH₂.CH₂.CH₂.X' disubstituted hexene 2.

X.CH₂.CH₂.CH=CH.CH₂.CH₂.CH₂.X'

1,7 disubstituted heptene 3.

X.CH₂.CH₂.CH=CH.CH₂.CH₂.X'

1,6 disubstituted hexene 3.

1,4 disubstituted pentene 2.

1,6 disubstituted heptene 3.

In all of the above compounds there are two carbon atoms joined to and separated by structure characterized by unsaturated hydrocarbons. This is a common quality running through the entire series. To each of the said carbon atoms there is joined a substituent which is split off during the reaction.

Owing to this common quality the polymers produced from these compounds by reaction with an alkaline polysulphide have a number of outstanding and important properties, as already described, which distinguish this compound from the polymers produced from disubstituted ethylene and propylene. This is particularly true after the intermediate potentially reactive polymers have been cured and the curing step will be illustrated by the following example:

*Example 7*

| Components | Parts by weight |
|---|---|
| Polymer produced as in Example 6 | 100.00 |
| Zinc oxide | 10.00 |
| Stearic acid | 0.05 |
| Benzothiazyl disulphide | 0.25 |
| Carbon black | 60.00 |

The above ingredients are thoroughly mixed by mastication, as for example on rubber mixing rolls, and the resulting compound is cured by heating to about 300° F. for about 1 hour. Instead of zinc oxide in the above formula other oxidizing agents can be used, i. e., oxides of copper, lead, bismuth, antimony, arsenic, manganese and chromium. Organic oxidizing agents including benzoyl peroxide and trinitro benzene can also be used.

The specific properties of the polymer produced as in Example 6 and cured as in Example 7, are as follows:

Tensile strength _____ 1000 lbs./sq. in.
Elongation _____ 400%.
Permanent set _____ 5%.
Ability to retain the above properties at temperatures as low as _____ −40° F.
Not swollen by long immersion in paraffin hydrocarbons.
Only slightly swollen by long immersion in benzol, toluol and carbon-tetrachloride.
Not affected by ozone.
Per cent sulphur _____ 71.00.

The compound produced, as in Example 6, is substantially a polymer of the unit $$\{-\overset{H_2}{C}-\overset{H}{C}=\overset{H}{C}-\overset{H_2}{C}-S_4-\}$$

It can be partially desulphurized as taught in Example 5 and converted into a compound which is substantially a polymer of the unit $$\{-\overset{H_2}{C}-\overset{H}{C}=\overset{H}{C}-\overset{H_2}{C}-S_4-\}$$

and the latter polymer can also be produced as taught in Example 3, i. e., by the mercaptan reaction, using 1,4 dimercapto butene (instead of dimercapto ethyl ether). Any of the compounds in the above Table 2, where X and X' are —SH groups, can be used instead of the dimercapto ethyl ether of Example 3.

INTERVENING STRUCTURE CHARACTERIZED BY SATURATED CARBON ATOMS

This is illustrated by the following compound

[X.CH₂.CH₂.CH₂.X']

Where X and X' are substituents capable of being split off by reaction with an alkaline polysulphide, this compound may be substituted for the ether of Example 1 in the same molecular proportion. The resulting compound is substantially a polymer of the unit

[—CH₂.CH₂.CH₂—S₄—]

It can be partially desulphurized as in Example 5 and converted into a compound which is substantially a polymer of the unit

[—CH₂.CH₂.CH₂—S₂—]

This compound can be also produced by the mercaptan reaction as taught in Example 3. The polymers so produced may be cured as taught in Examples 2, 4 and 7.

One of the advantages of such polymers over those obtained from compounds like ethylene or propylene dichloride is freedom from the disagreeable odor of the latter.

Instead of the specific compound above mentioned others that may be employed are as follows:

X.(CH₂)₄.X'
X.(CH₂)ₙ.X' thus producing a series of compounds which are substantially polymers of the unit

[—(CH₂)ₙ—S₂ to ₆—]

where $n$ is greater than 2. As $n$ increases, the elasticity of the cured and uncured polymers decreases and the ductility increases, in general.

INTERVENING STRUCTURE CHARACTERIZED BY AROMATIC OR ARYL STRUCTURE

This is illustrated by the following compound:

Where X and X' are substituents capable of being split off by reaction with an alkaline polysulphide, this compound may be substituted for the ether of Example 1 in the same molecular proportion. The resulting compound is substantially a polymer of the unit

It may be partially desulphurized as in Example 5 and converted into a polymer which is substantially a polymer of the unit

This compound can be also obtained by the mercaptan reaction as taught in Example 3. The polymers so produced can be cured as in Examples 2, 4 and 7.

Where X and X' are substituents joined directly to the nucleus of the said intervening aromatic structure, and capable of being split off during reaction with alkaline polysulphide, higher temperatures are necessary, as a rule, than where said substituents are joined to aliphatic carbon atoms. This is illustrated by the following reaction:

*Example 8*.—To one liter of 2 molar sodium tetrasulphide add a suspension of Mg(OH)₂ made by dissolving 25 grams of crystallized magnesium chloride in 100 cc. water and adding a solution of 10 grams of NaOH in 50 cc. water. Add about one mol (150 grams) of para dichlor benzene. Place the mixture in an autoclave, preferably provided with a stirrer, and heat to about 300° C.

for about 10 hours. Cool to room temperature and proceed further as taught in previous examples.

Instead of paraxylene dichloride or paradichlor benzene other compounds may be selected, as for example, any of those shown in Table III below. For the reaction with alkaline polysulfide, X and X' are substituents capable of being split off during said reaction. For the mercaptan reaction, X and X' are —SH groups:

Table III

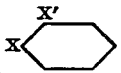

orthodisubstituted benzene.

disubstituted ortho xylene.

pp'disubstituted diethyl benzene.

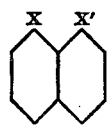

aa'disubstituted naphthalene.

bb'disubstituted naphthalene.

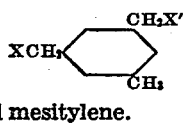

1,3 disubstituted mesitylene.

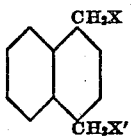

disubstituted 1,4 dimethyl naphthalene.

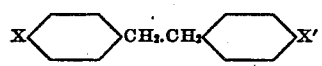

pp'disubstituted dibenzyl.

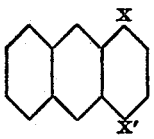

aa'disubstituted anthracene.

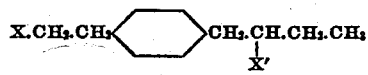

disubstituted para ethyl butyl benzene.

X.CH₂.CH₂.CH₂⟨⟩CH₂.CH₂.CH₂.CH.CH₂.CH₃
                              |
                              X' disubstituted para hexyl propyl benzene.

In all of the above examples there are two carbon atoms joined to and separated by aromatic structure or structure characterized by an aromatic or aryl group or groups. This is a common quality running through the entire series.

Owing to this common quality the polymers produced from these compounds have a number of outstanding and important properties, as already described, which distinguish them from the polymers produced from disubstituted ethylene and propylene. This is particularly true after the intermediate potentially reactive polymers have been cured and the curing step will be illustrated by the following example:

*Example 9*

| Components | Parts by weight |
|---|---|
| Polymer produced from paradichlor xylene | 100.00 |
| Zinc oxide | 10.00 |
| Stearic acid | 0.05 |
| Benzothiazyl disulphide | 0.25 |
| Carbon black | 60.00 |

The above ingredients are thoroughly mixed by mastication, as for example, on rubber mixing rolls and the resulting compound is cured by heating to about 300° F. for about 1 hour. Instead of zinc oxide other oxidizing agents can be used in the above formula, e. g., oxides of copper, lead, bismuth, antimony, arsenic, manganese and chromium. Organic oxidizing agents including benzoyl peroxide and trinitro benzo can also be used.

All such polymers may be compound and cured as in Example 9. When the compound made from disubstituted paraxylene is so cured, it develops properties which may be contrasted with those obtained by curing a polymer made from a compound having no intervening structure, e. g., ethylene dichloride, as shown by the following table. All compounding, curing and other conditions are the same, the difference being that caused by introducing the benzene ring between the carbon atoms of ethylene dichloride.

| | Polymer from ethylene dichloride | Polymer from para dichlor xylene |
|---|---|---|
| Tensile strength | 650 lbs./sq. in | 3000 lbs./sq. in. |
| Elongation | 500% | 10%. |
| Odor | Bad | Odorless or pleasant odor. |

In general, the introduction of aromatic structure between the reactive carbon atoms (i. e., the carbon atoms to which are attached the substituents split off during reaction with alkaline polysulphide where the polysulphide reaction is used, or the carbon atoms to which —SH groups are attached where the mercaptan reaction is used) produces products of a hard nature, having in many cases high tensile strength and great elasticity but low elongation.

Enough illustration has been supplied to make apparent the profound influence of the intervening structure and to make apparent the fact that the invention is not limited to the particular classes of such intervening structure specifically mentioned.

I claim:
1. An organic compound said compound being substantially a polymer of the unit

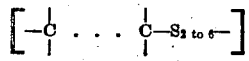

where

represents two carbon atoms joined to and separated by intervening structure, said compound being capable of being cured by heat.

2. The reaction product of an alkaline polysulphide and an organic compound having the formula

where

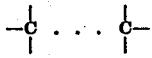

represents two carbon atoms joined to and separated by intervening structure and X and X' represent substituents which are split off during the reaction.

3. The process which comprises reacting an alkaline polysulphide with an organic compound having the formula

where

represents two carbon atoms joined to and separated by intervening structure and X and X' represent substituents which are split off during the reaction.

4. An organic compound, said compound being substantially a polymer of the unit

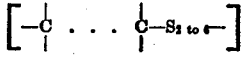

where

represents carbon atoms separated by and joined to intervening structure characterized by an ether linkage, and S is a sulphur atom.

5. A product comprising the reaction product of an alkaline polysulphide with an organic compound having two carbon atoms separated by and joined to structure characterized by an ether linkage, said carbon atoms having joined thereto, respectively, substituents which are split off during the reaction.

6. A product comprising the reaction product of an alkaline polysulphide and an ether having two carbon atoms separated by and joined to intervening structure containing an oxygen atom, said carbon atoms having joined thereto, respectively, substituents which are split off during the reaction.

7. A product comprising the reaction product of an alkaline polysulphide with an ether having two terminal carbon atoms and a halogen attached to each of said two terminal carbon atoms.

8. A product comprising the reaction product of an alkaline polysulfide and BB' dihalogenated ethyl ether.

9. The process which comprises reacting an alkaline polysulphide with an organic compound containing two carbon atoms separated by and joined to intervening atomic structure characterized by an ether linkage, said carbon atoms having joined thereto, respectively, substituents which are split off during the reaction.

10. The process which comprises reacting an alkaline polysulphide with an organic compound containing two carbon atoms separated by and joined to atomic structure characterized by an ether linkage and a halogen atom attached to each of said carbon atoms.

11. The process which comprises reacting an alkaline polysulphide with an organic compound containing two aliphatic carbon atoms separated by and joined to atomic structure characterized by an ether linkage, said carbon atoms having joined thereto, respectively, substituents which are split off during the reaction.

12. The process which comprises reacting an alkaline polysulphide with an organic compound containing two carbon atoms separated by and joined to atomic structure characterized by an ether linkage, said carbon atoms having joined thereto, respectively, substituents which are split off during the reaction, in a dispersion medium under alkaline conditions, obtaining a polymer in dispersed form, removing impurities from said polymer, separating the polymer from said medium and obtaining said polymer in intermediate potentially reactive form capable of being cured by a subsequent heat treatment.

13. The process which comprises reacting an alkaline polysulphide with an organic compound containing a halogen attached to each of two terminal carbon atoms which carbon atoms are separated by and joined to atomic structure characterized by an ether linkage.

14. The process which comprises reacting an alkaline polysulphide with an ether having two terminal carbon atoms, said carbon atoms having joined thereto, respectively, substituents which are split off during the reaction.

15. The process which comprises reacting an alkaline polysulphide with BB' dihalogenated ethyl ether.

16. The process which comprises reacting an alkaline polysulphide with an ether having two terminal carbon atoms and a halogen attached to each of said two terminal carbon atoms.

17. The process which comprises reacting an alkaline polysulphide with an ether having two terminal aliphatic carbon atoms, said carbon atoms having joined thereto, respectively, substituents which are split off during the reaction.

18. The process which comprises reacting an alkaline polysulphide with an ether having two terminal aliphatic carbon atoms and a halogen joined to each of said two terminal aliphatic carbon atoms.

19. The process which comprises reacting an alkaline polysulphide with symmetrical dihalogenated ethyl ether.

20. The reaction product of an alkaline polysulphide and an ether having two terminal aliphatic carbon atoms and a halogen joined to each of said two terminal aliphatic carbon atoms.

21. The reaction product of an alkaline polysulphide and symmetrical dihalogenated ethyl ether.

22. A potentially reactive compound capable of being cured by heat, said compound being a polymer of the unit [R S₂ to ₆—] where R is a radical having a pair of carbon atoms separated by and joined to intervening structure characterized by the group

and S is a sulphur atom.

23. A product comprising the reaction product of an alkaline polysulphide with an organic compound having two aliphatic carbon atoms separated by and joined to structure characterized by the group

said carbon atoms having joined thereto, respectively, substituents which are split off during the reaction.

24. A product comprising the reaction product of an alkaline polysulphide with an organic compound having two terminal aliphatic carbon atoms separated by and joined to structure characterized by the group

said carbon atoms having joined thereto, respectively, substituents which are split off during the reaction.

25. A product comprising the reaction product of an alkaline polysulphide with an organic compound having two carbon atoms separated by and joined to structure characterized by the group

said carbon atoms having halogen atoms joined thereto, respectively.

26. A product comprising the reaction product of an alkaline polysulphide with an organic compound having two terminal carbon atoms separated by and joined to structure characterized by the group

said terminal carbon atoms having halogen atoms joined thereto, respectively.

27. A product containing the reaction product of an alkaline polysulphide with an organic compound having two terminal aliphatic carbon atoms separated by and joined to structure characterized by the group

said two terminal aliphatic carbon atoms having halogen atoms joined thereto, respectively.

28. A product comprising the reaction product of an alkaline polysulphide with 1,4 dihalogenated butene 2.

29. The process which comprises reacting an alkaline polysulphide with an organic compound having two carbon atoms separated by and joined to structure characterized by the group

said carbon atoms having joined thereto, respectively, substituents which are split off during the reaction.

30. The process which comprises reacting an alkaline polysulphide with an organic compound having two aliphatic carbon atoms separated by and joined to structure characterized by the group

said carbon atoms having joined thereto, respectively, substituents which are split off during the reaction.

31. The process which comprises reacting an alkaline polysulphide with an organic compound having two terminal aliphatic carbon atoms separated by and joined to structure characterized by the group

said carbon atoms having joined thereto, respectively, substituents which are split off during the reaction.

32. The process which comprises reacting an alkaline polysulphide with an organic compound having two carbon atoms separated by and joined to structure characterized by the group

said carbon atoms having halogen atoms joined thereto, respectively.

33. The process which comprises reacting an alkaline polysulphide with an organic compound having two terminal carbon atoms separated by and joined to structure characterized by the group

said carbon atoms having halogen atoms joined thereto, respectively.

34. The process which comprises reacting an alkaline polysulphide with an organic compound having two terminal aliphatic carbon atoms separated by and joined to structure characterized by the group

said carbon atoms having halogen atoms joined thereto, respectively.

35. A potentially reactive compound capable of being cured by heat, said compound being a polymer of the unit [R S$_{2\,to\,6}$] where R is a radical having a pair of carbon atoms separated by and joined to intervening aromatic structure and S is a sulphur atom.

36. A product comprising the reaction product of an alkaline polysulphide with an organic compound having two carbon atoms separated by and joined to aromatic structure, said carbon atoms having joined thereto, respectively, substituents which are split off during the reaction.

37. A product comprising the reaction product of an alkaline polysulphide with an organic compound having two carbon atoms separated by and joined to structure characterized by an aryl group, said carbon atoms having joined thereto, respectively, substituents which are split off during the reaction.

38. A product comprising the reaction product of an alkaline polysulphide with an organic compound having two aliphatic carbon atoms separated by and joined to structure characterized by an aryl group, said carbon atoms having joined thereto, respectively, substituents which are split off during the reaction.

39. A product comprising the reaction product of an alkaline polysulphide with an organic compound having two terminal aliphatic carbon atoms separated by and joined to structure characterized by an aryl group, said carbon atoms having joined thereto, respectively, substituents which are split off during the reaction.

40. A product comprising the reaction product of an alkaline polysulphide with an organic compound having two aliphatic carbon atoms separated by and joined to structure characterized by an aryl group, said carbon atoms having halogen atoms joined thereto, respectively.

41. A product comprising the reaction product of an alkaline polysulphide with pp' dihalogenated xylene.

42. The process which comprises reacting an alkaline polysulphide with an organic compound having two carbon atoms separated by and joined to aromatic structure, said carbon atoms having joined thereto, respectively, substituents which are split off during the reaction.

43. The process which comprises reacting an alkaline polysulphide with an organic compound having two carbon atoms separated by and joined to structure, characterized by an aryl group, said carbon atoms having joined thereto, respectively, substituents which are split off during the reaction.

44. The process which comprises reacting an alkaline polysulphide with an organic compound having two aliphatic carbon atoms separated by and joined to structure, characterized by an aryl group, said carbon atoms having joined thereto, respectively, substituents which are split off during the reaction.

45. The process which comprises reacting an alkaline polysulphide with an organic compound having two terminal aliphatic carbon atoms separated by and joined to structure characterized by an aryl group, said carbon atoms having joined thereto, respectively, substituents which are split off during the reaction.

46. The process which comprises reacting an alkaline polysulphide with an organic compound having two aliphatic carbon atoms separated by and joined to structure characterized by an aryl group, said carbon atoms having halogen atoms joined thereto, respectively.

47. The process which comprises reacting an alkaline polysulphide with pp' dihalogenated xylene.

48. The process which comprises causing interaction between water soluble sulphides selected from the group consisting of alkali metal, ammonium, and alkaline earth metal sulphides and aromatic compounds having at least two halogen atoms in aliphatic side-chains.

49. The process as claimed in claim 48, in which the water soluble sulphide is a polysulphide.

50. The process which comprises causing interaction between water soluble sulphides selected from the group consisting of alkali metal, ammonium and alkaline earth metal sulphides and aromatic compounds having at least two halogen atoms in aliphatic sidechains, the reaction being performed in an aqueous medium in the presence of an emulsifying agent.

51. The compounds which are substantially identical with those obtainable by the process which comprises causing interaction between water-soluble sulphides selected from the group consisting of alkali metal, ammonium and alkaline earth metal sulphides and aromatic compounds having at least two halogen atoms in aliphatic side-chains.

52. The compounds which are substantially identical with those obtainable by the process which comprises causing interaction between water soluble polysulphides selected from the group consisting of alkali metal, ammonium and alkaline earth metal polysulphides and aromatic compounds having at least two halogen atoms in aliphatic side-chains.

53. The process which comprises causing interaction between water-soluble polysulphides selected from the group consisting of alkali metal ammonium and alkaline earth metal polysulphides and aromatic compounds having at least two substituents in aliphatic side chains which substituents are split off during the reaction.

54. The compounds which are substantially identical with those obtainable by the process which comprises causing interaction between water-soluble polysulphides selected from the group consisting of alkali metal ammonium and alkaline earth metal polysulphides and aromatic compounds having at least two substituents in aliphatic side chains which substituents are split off during the reaction.

55. The process which comprises providing a potentially reactive compound capable of being cured by heat, said compound being a polymer of the unit [R S$_2$ to $_6$] where R is a radical having a pair of carbon atoms separated by and joined to intervening structure characterized by the group $$-\overset{|}{\underset{|}{C}}=\overset{|}{\underset{|}{C}}-$$

and S is a sulphur atom; incorporating said compound with a metallic oxide and heating the resulting compound and thereby curing it.

56. A composition of matter which is substantially identical with that produced by the process which comprises heating a compound obtained by incorporating a metallic oxide with a polymer of the unit [R S$_2$ to $_6$] where R is a radical having a pair of carbon atoms separated by and joined to intervening structure characterized by the group $$-\overset{|}{\underset{|}{C}}=\overset{|}{\underset{|}{C}}-$$

and S is a sulphur atom.

JOSEPH C. PATRICK.